(12) United States Patent
Commaret et al.

(10) Patent No.: US 8,127,551 B2
(45) Date of Patent: Mar. 6, 2012

(54) TURBOMACHINE WITH A DIFFUSER

(75) Inventors: Patrice Commaret, Rubelles (FR); Didier Hernandez, Quiers (FR)

(73) Assignee: SNECMA, Paris (FR)

( * ) Notice: Subject to any disclaimer, the term of this patent is extended or adjusted under 35 U.S.C. 154(b) by 915 days.

(21) Appl. No.: 12/173,945

(22) Filed: Jul. 16, 2008

(65) Prior Publication Data

US 2010/0031663 A1 Feb. 11, 2010

(30) Foreign Application Priority Data

Aug. 13, 2007 (FR) .................................... 07 57051

(51) Int. Cl.
*F02C 1/00* (2006.01)
*F02C 3/06* (2006.01)
(52) U.S. Cl. ............ 60/751; 60/726; 60/804; 415/208.4
(58) Field of Classification Search .................... 60/751, 60/726, 269, 804; 415/208.3, 208.4, 211.1, 415/136
See application file for complete search history.

(56) References Cited

U.S. PATENT DOCUMENTS

| | | | |
|---|---|---|---|
| 3,088,279 A | 5/1963 | Diedrich et al. | |
| 4,462,204 A | 7/1984 | Hull | |
| 4,466,250 A | 8/1984 | Mukaeda | |
| 5,555,721 A | 9/1996 | Bourneuf et al. | |
| 6,279,322 B1 * | 8/2001 | Moussa | 60/751 |
| 7,581,397 B2 * | 9/2009 | Strangman et al. | 60/751 |
| 2001/0047651 A1 | 12/2001 | Fukutani | |

OTHER PUBLICATIONS

U.S. Appl. No. 12/993,949, filed Nov. 22, 2010, Hernandez, et al.
U.S. Appl. No. 12/190,105, filed Aug. 12, 2008, Commaret, et al.

* cited by examiner

*Primary Examiner* — Ehud Gartenberg
*Assistant Examiner* — Arun Goyal
(74) *Attorney, Agent, or Firm* — Oblon, Spivak, McClelland, Maier & Neustadt, L.L.P.

(57) ABSTRACT

A turbomachine including an annular combustion chamber, a centrifugal compressor, an annular diffuser enabling the flow of gas leaving the compressor to be diffused and directing this flow of gas towards the combustion chamber, and an outer casing surrounding the outside of the combustion chamber is disclosed. The diffuser includes an upstream portion oriented radially and presenting diffusion passages connected to the outlet from the compressor, an intermediate portion that is elbow-shaped, and a downstream portion having a series of circularly spaced-apart flow-straightening vanes. The flow stream in the downstream portion is delimited externally by the outer casing. The outer casing presents a shoulder against which the outer downstream edge of the intermediate portion comes into abutment.

10 Claims, 4 Drawing Sheets

TURBOMACHINE WITH A DIFFUSER

The invention relates to a turbomachine. It is applicable to any type of turbomachine whether terrestrial or for aviation, and more particularly it relates to airplane turbojets.

BACKGROUND OF THE INVENTION

In the present application, the terms "upstream" and "downstream" are defined relative to the normal flow direction of gas (from upstream to downstream) through the turbomachine. Furthermore, the term "turbomachine axis" is used to designate the axis of rotation of the rotor of the turbomachine. The axial direction corresponds to the direction of the turbomachine axis, and a radial direction is a direction perpendicular to said axis. Similarly, an axial plane is a plane containing the axis of the turbomachine and a radial plane is a plane perpendicular to said axis. Finally, unless specified to the contrary, adjectives such as "inner" and "outer" are used relative to a radial direction so that a (radially) inner portion or face of an element is closer to the axis of the turbomachine than is a (radially) outer portion or face of the same element.

The invention relates to a turbomachine of the type comprising:
- an annular combustion chamber;
- a centrifugal compressor;
- an annular diffuser enabling the flow of gas leaving the compressor to be diffused, and directing this flow of gas towards the combustion chamber, the diffuser comprising: an upstream portion oriented radially and presenting diffusion passages connected to the outlet from the compressor; an intermediate portion that is elbow-shaped; and a downstream portion having a series of circularly spaced-apart flow-straightening vanes; and
- an outer casing surrounding the outside of the combustion chamber and the downstream portion.

A centrifugal compressor comprises a centrifugal impeller that serves to accelerate the gas passing therethrough, and thereby increase the kinetic energy of said gas.

The diffuser presents an annular space surrounding the compressor. The diffuser serves to slow down the speed of the gas leaving the compressor, and as a result increases its static pressure. Diffusers may be of the vane type or of the duct type.

Both of those types of diffuser comprise an annular upstream portion oriented radially and presenting a series of diffusion passages connected to the outlet of the compressor to pick up the accelerated gas leaving the compressor. The section of the diffuser passages increases progressively from the inside towards the outside so as to diffuse the flow of gas leaving the compressor. Diffusers of the vane type make use of a series of diffusion vanes spaced apart circularly and forming diffusion passages between one another. In diffusers of the duct type, the diffusion passages are constituted by pipe or duct elements.

Downstream from said upstream portion, diffusers have an annular intermediate portion that is elbow-shaped for curving the flow path of the diffuser and for causing the gas to flow towards the combustion chamber.

Downstream from the intermediate portion, a diffuser has an annular downstream portion with a series of circularly spaced-apart flow-straightening vanes for straightening the flow of gas and thus reducing the gyratory component of the gas flow leaving the diffusion passages, prior to the flow entering the combustion chamber.

FIG. 1 shows a known example of a turbomachine of the above-described type that comprises, in the gas flow direction: a centrifugal compressor 110; an annular diffuser 120 having diffusion vanes 123; and an annular combustion chamber 140. An outer casing 132 surrounds the outside of the combustion chamber 140 and of the diffuser 120.

The diffuser 120 comprises: an upstream portion 121 that is radially oriented, presenting diffusion passages 122; an elbow-shaped intermediate portion 124; and a downstream portion 125 comprising a series of circularly spaced-apart flow-straightening vanes 126.

The flow stream is defined as being the space in which the gas flows.

The flow stream in the upstream and intermediate portions 121 and 124 is delimited by a first end plate 127 and a second end plate 128. The flow stream in the downstream portion 126 is delimited internally by the first end plate 127 and externally by an outer shroud 129.

The downstream portion 125 of the diffuser is oriented parallel to the axis A of the turbomachine. In other words, in a section plane containing the axis A of the turbomachine, the mean axis M of the flow stream leaving the downstream portion 125 of the diffuser is parallel to the axis A of the turbomachine. In this configuration, the main gas stream leaving the diffuser passes externally around the combustion chamber 140.

In an alternative that is not shown, in order to cause the main gas stream leaving the diffuser 120 to be directed towards the combustion chamber 140, so that the combustion chamber is thus better fed with gas, the downstream portion 125 of the diffuser is inclined relative to the axis A of the turbomachine so as to point towards the combustion chamber 140. In other words, in a section plane containing the axis A of the turbomachine, the mean axis M of the flow stream leaving the downstream portion 125 of the diffuser forms a (non-zero) acute angle with the axis A.

The drawbacks of known diffusers lie in the fact that the parts making them up are difficult to assemble together. In particular, when the downstream portion 125 is inclined relative to the axis A, it is particularly difficult to fasten the outer shroud 129 by brazing, or by crimping onto the downstream portion 125, since the outer surface of the downstream portion 125 is conical and the outer shroud 129 tends to slide towards the free end of the downstream portion 126.

OBJECTS AND SUMMARY OF THE INVENTION

An object of the invention is to propose a turbomachine of the above-specified type having a diffuser that is easier to assemble than prior art diffusers.

To achieve this object, the invention provides a turbomachine comprising:
- an annular combustion chamber;
- a centrifugal compressor;
- an annular diffuser enabling the flow of gas leaving the compressor to be diffused and directing this flow of gas towards the combustion chamber, the diffuser comprising: an upstream portion oriented radially and presenting diffusion passages connected to the outlet from the compressor; an intermediate portion that is elbow-shaped; and a downstream portion having a series of circularly spaced-apart flow-straightening vanes; and
- an outer casing surrounding the outside of the combustion chamber and the downstream portion;

in which the flow stream in the downstream portion is delimited externally by the outer casing.

The invention thus consists in making use of the outer casing to form the outer wall of the downstream portion. This makes it possible to omit the shroud that is normally used and thus to avoid the problems associated with fastening such a shroud. In addition, no longer having an outer shroud generally makes it possible to reduce the weight of the diffuser.

In addition, according to the invention, the outer casing presents a shoulder against which the outer downstream edge of the intermediate portion of the diffuser comes into abutment. By means of this shoulder, the intermediate portion can be positioned correctly and easily relative to the casing. This makes it easier to assemble the diffuser.

In a particular embodiment of the invention, the flow-straightening vanes are not fastened to the outer casing, thereby further simplifying assembly of the diffuser. Under such circumstances, and advantageously, in order to avoid the drawbacks associated with the expansion phenomena that occur during operation of the turbomachine, clearance is provided, when cold, between the flow-straightening vanes and the outer casing. When hot, this clearance decreases, and preferably becomes zero or slightly negative.

In a particular embodiment of the invention, the facing walls of the upstream and intermediate portions are formed by a first end plate and by a second end plate, these first and second end plates being distinct from the casing and delimiting the flow stream in the upstream and intermediate portions.

BRIEF DESCRIPTION OF THE DRAWINGS

The invention and its advantages can be better understood on reading the following detailed description of embodiments of the invention given by way of non-limiting illustration. The description refers to the accompanying figures, in which.

MORE DETAILED DESCRIPTION

Figure 1:
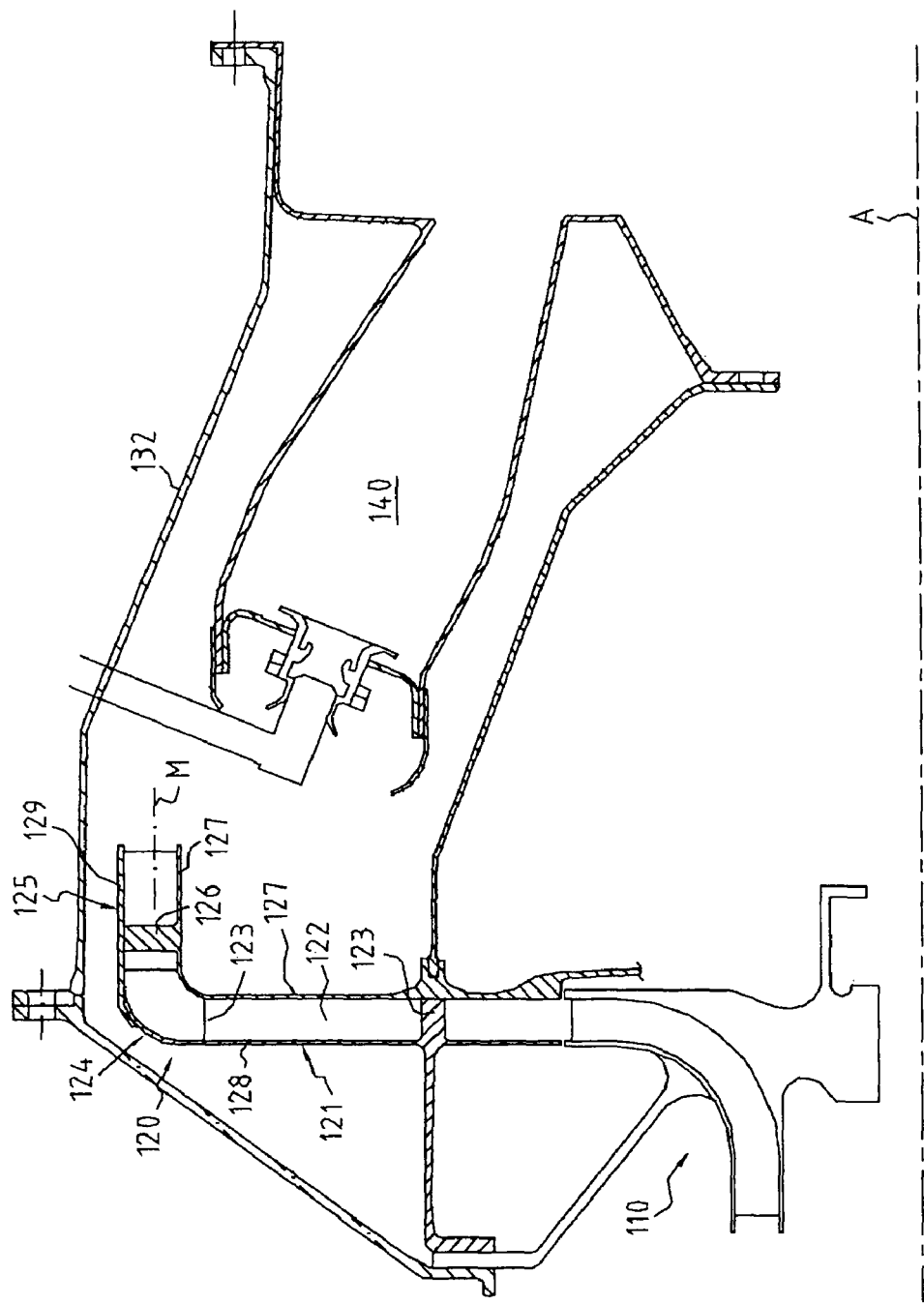
FIG. 1 is a diagrammatic axial half-section showing the compressor, the diffuser, and the combustion chamber module in a prior art example of an airplane turbojet.
Figure 2:
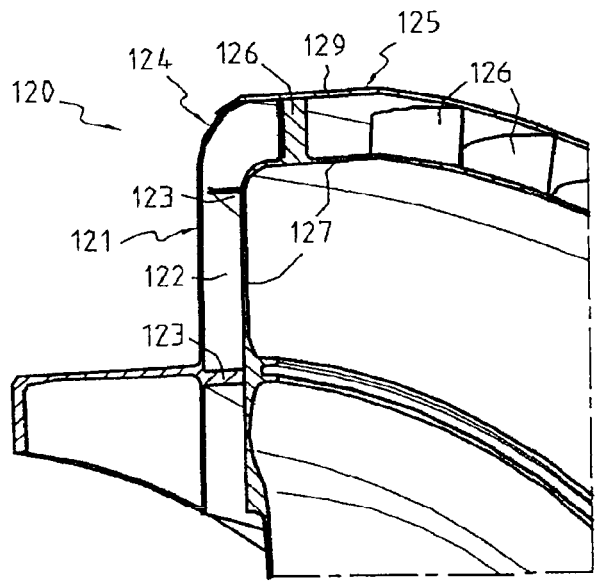
FIG. 2 is a perspective view of the FIG. 1 diffuser.

FIGS. 1 and 2 show the prior art and are descried above.

Figure 3:
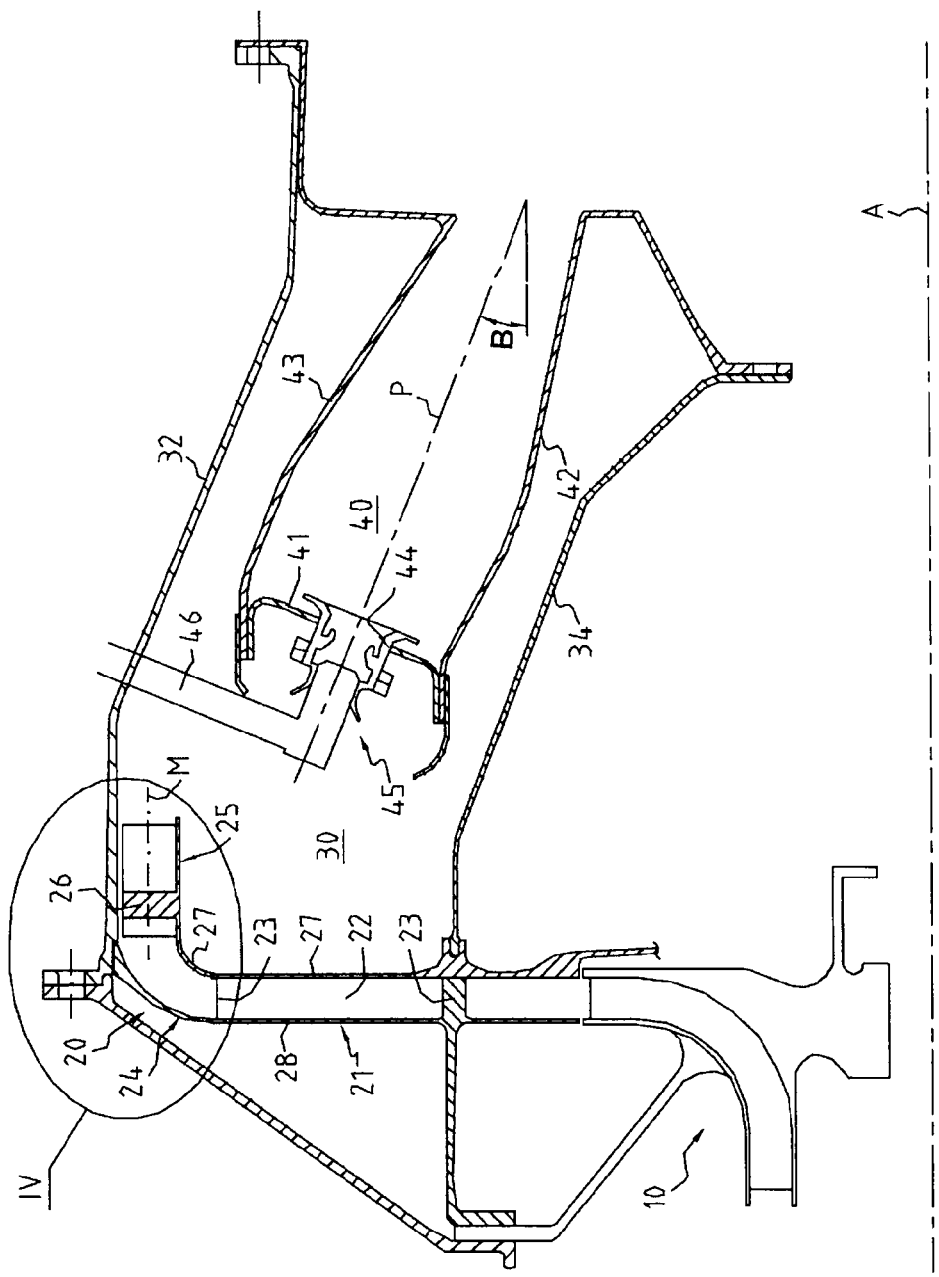
FIG. 3 is a diagrammatic axial half-section showing the compressor, the diffuser, and the combustion chamber module of an example of an airplane turbojet in accordance with the invention.

FIG. 3 shows a portion of an example of a turbomachine of the invention. More particularly, the turbomachine is an airplane turbojet. The gas passing through the turbojet is air.

The turbojet comprises a centrifugal high pressure compressor 10, an annular diffuser 20 connected downstream from the compressor 10, said diffuser opening out into a space 30 surrounding an annular combustion chamber 40. The space 30 is delimited by an outer casing 32 and an inner casing 34 coaxial therewith. The combustion chamber 40 is supported by fastening flanges that are connected to the casings 32 and 34.

The centrifugal compressor 10 is a centrifugal impeller. The impeller comprises a series of moving blades that are driven in rotation. These blades receive air axially, accelerate it, and release it radially into the diffuser 20.

The diffuser 20 presents an annular space surrounding the compressor 10. The diffuser 20 serves to reduce the speed of the air leaving the compressor 10, and thereby serves to increase its static pressure. The diffuser 20 in the figures is of the vane type.

The diffuser 20 comprises an annular upstream portion 21 that is oriented radially, presenting a series of diffusion passages 22 that are connected to the outlet from the compressor 10 in order to pick up the accelerated air leaving the compressor 10. These diffusion passages 22 are of section that increases progressively in the radial direction going from the inside towards the outside in order to diffuse the flow of gas leaving the compressor 10. These diffusion passages 22 are formed by a series of circularly spaced-apart diffusion vanes 23. At the inlet to the upstream portion 21, these vanes 23 are close to one another. These diffusion vanes 23 become circumferentially spaced further apart from one another on approaching the outlet from the upstream portion 21.

Downstream from the upstream portion 21, the diffuser 20 has an annular intermediate portion 24 that is elbow-shaped to curve the flow path of the diffuser and deflect the flow of air towards the combustion chamber 40.

Downstream from the intermediate portion 24, the diffuser 20 has an annular downstream portion 25 comprising a series of circularly spaced-apart flow-straightening vanes 26 to reduce the gyratory component of the gas flow leaving the diffusion passages 22 prior to the gas flow entering into the space 30.

A first end plate 27 forms the inner wall of the downstream portion 25, such that the flow stream in the downstream portion 25 is delimited internally by the first end plate 27. This end plate 27 carries the flow-straightening vanes 26 (i.e. the vanes 26 are secured to the end plate 27).

The facing walls of the upstream and intermediate portions 21 and 24 are formed by the first end plate 27 and by a second end plate 28. Thus, these first and second end plates 27 and 28 delimit the flow stream in the upstream and intermediate portions 21 and 24.

The second end plate 28 carries the diffusion vanes 23, and during assembly of the diffuser 20, the first end plate 27 is brazed to the diffusion vanes 23.

The combustion chamber 40 comprises an annular inner wall 42, an annular outer wall 43, and an annular chamber end wall 41 disposed between said inner and outer walls 42 and 43 in the upstream region of said chamber. The chamber end wall 41 presents injection orifices 44 that are circularly distributed around the axis A. Injector systems 45 are mounted on the chamber end wall 41 through said injection orifices 44 (with one injector system 45 per injection orifice 44). These injector systems 45 serve to inject the air-and-fuel mixture that is burnt in the combustion chamber 40. The fuel of this mixture is delivered to the injector systems 45 via respective fuel feed pipes 46 that pass through the space 30.

The combustion chamber 40 (i.e. the main axis P of the chamber) is inclined relative to the axis A of the turbojet by a (non-zero) acute angle B. The greater this angle B the greater the extent to which the axial length of the combustion chamber module is shortened.

In the example of FIG. 3, the downstream portion 25 of the diffuser is oriented axially in the sense that the mean axis M of the flow stream leaving the downstream portion 25 of the diffuser is parallel to the axis A.

The outer casing 32 is disposed radially outside the combustion chamber 40 and the downstream portion 25 of the diffuser 20.

In accordance with the invention, the outer casing 32 constitutes the outer wall of the downstream portion 25, so as to delimit the outside of the air flow stream in said downstream portion 25. More precisely, the inner wall of the outer casing 32 delimits this flow stream.

Figure 4:
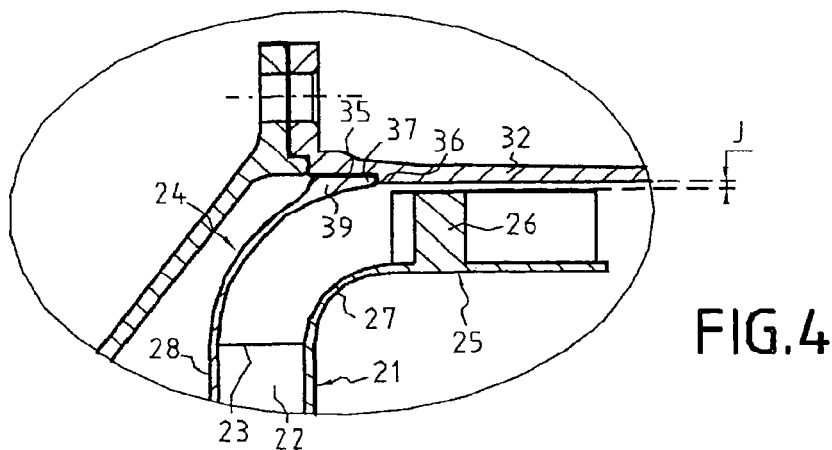
FIG. 4 shows a detail of the FIG. 3 diffuser.

As shown in detail in FIG. 4 the flow-straightening vanes 26 are not fastened to the outer casing 32.

When cold, there remains clearance J between the flow-straightening vanes 26 and the outer casing 32. This clearance J decreases as the turbojet heats up, because of the difference in expansion between the outer casing 32 and the first end plate 27 together with the vanes 26. When hot, the clearance J can be zero or even slightly negative, such that the vanes 26 are flush with or pressed lightly against the outer casing 32. This contact should not be pressed hard in order to avoid damaging the vanes 26 or the casing 32.

The outer casing 32 presents a shoulder 36 against which the outer downstream edge 37 of the intermediate portion 24 comes into abutment during assembly of the diffuser. The shoulder 36 is thus used as a reference and as a guide for proper positioning of the intermediate portion 24.

Still for the purpose of making it easier to position the intermediate portion 24, the outer wall 39 of the intermediate portion 24 bears against the outer casing 32, the bearing interface 35 between the outer wall 39 and the casing being a cylindrical surface of revolution, with significant axial width.

Figure 6:
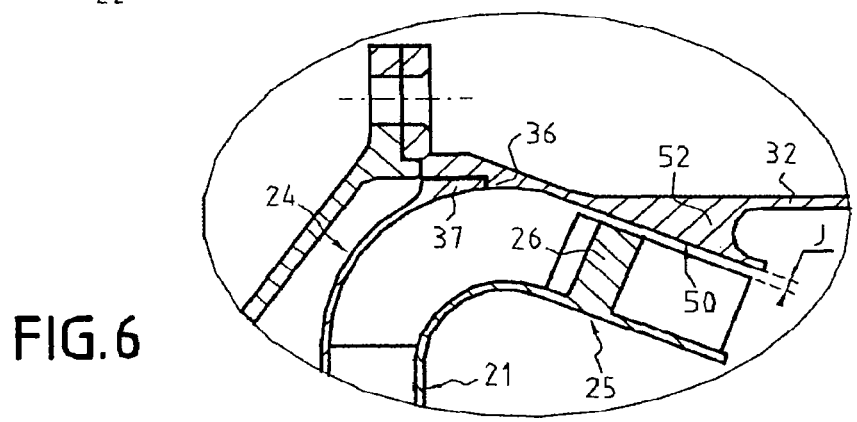
FIG. 6 shows a detail of the FIG. 5 diffuser.
Figure 5:
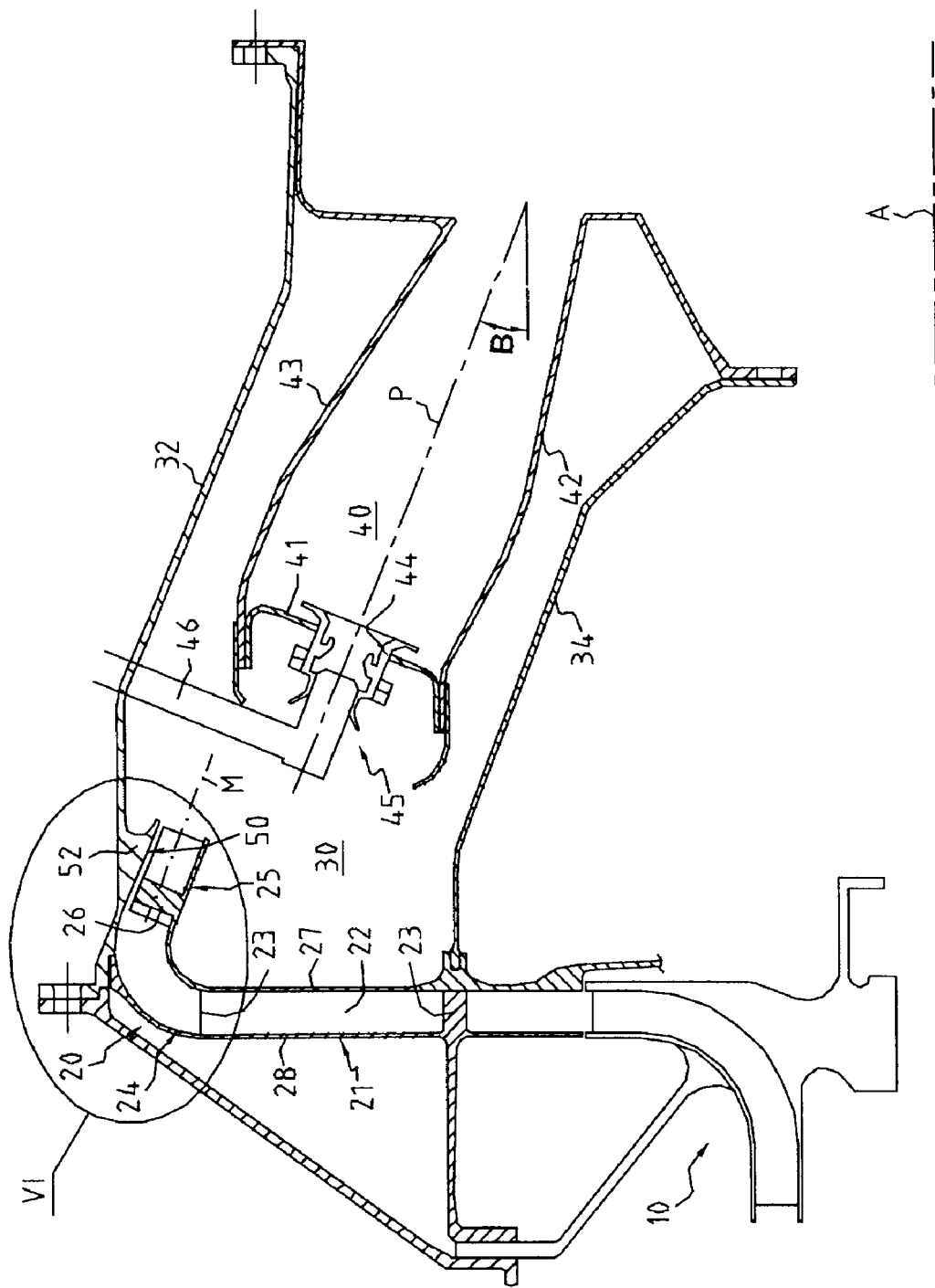
FIG. 5 is a diagrammatic axial half-section shown the compressor, the diffuser, and the combustion chamber module of another example of an airplane turbojet in accordance with the invention.

With reference to FIGS. 5 and 6, there follows a description of another example of a turbojet of the invention. Analogous elements between this example and the example of FIGS. 3 and 4 are given the same numerical references.

This turbojet differs from that of FIGS. 3 and 4 in that the downstream portion 25 of the diffuser is inclined relative to the axis A of the turbomachine towards the combustion chamber 40 so that, in a section plane containing the axis A of the turbomachine, the mean axis M of the flow stream leaving the downstream portion 25 of the diffuser forms a non-zero acute angle with the axis A, said axis M preferably intersecting the chamber end wall 41.

Such an angle of inclination of the downstream portion 25 of the diffuser 20 relative to the axis A of the turbomachine serves to reduce head loss in the gas between the outlet from the diffuser 20 and the combustion chamber 40. It also enables gas to be fed in more symmetrical manner to the bypass zones going externally and internally round the chamber 40, and also serves to feed gas better to the inner bypass zone. Furthermore, the gas feed to the injector system 45 is also more symmetrical.

In this example, the outer casing 32 presents a frustoconical inside surface portion 50 facing the flow-straightening vanes 26 so that this frustoconical surface portion 50 is a close fit (ignoring the clearance J) around the outlines defined by the flow-straightening vanes 26. In this example, the frustoconical surface portion 50 is made as an extra thickness portion 52 of the outer casing 32.

What is claimed is:

1. A turbomachine comprising:
an annular combustion chamber;
a centrifugal compressor;
an annular diffuser enabling the flow of gas leaving the compressor to be diffused and directing this flow of gas towards the combustion chamber, the diffuser comprising: an upstream portion oriented radially and presenting diffusion passages connected to the outlet from the compressor; an intermediate portion that is elbow-shaped; and a downstream portion having a series of circularly spaced-apart flow-straightening vanes; and
an outer casing surrounding the outside of the combustion chamber and the downstream portion;
wherein the flow stream in the downstream portion is delimited externally by the outer casing, the outer casing presenting a shoulder against which an outer downstream edge of the intermediate portion comes into abutment;
wherein the flow-straightening vanes are not fastened to the outer casing;
wherein, when cold there exists clearance between the flow-straightening vanes and the outer casing.

2. A turbomachine according to claim 1, wherein the facing walls of the upstream and intermediate portions are formed by a first end plate and by a second end plate, these first and second end plates being distinct from the casing and delimiting the flow stream in the upstream and intermediate portions.

3. A turbomachine according to claim 1, wherein the outer wall of the intermediate portion bears against the outer casing, the bearing interface between said outer wall and the casing being a cylindrical surface.

4. A turbomachine according to claim 1, wherein the outer casing presents a frustoconical inner surface portion facing the flow-straightening vanes.

5. A turbomachine according to claim 1, wherein the flow stream in the downstream portion is delimited internally by an end plate, the end plate also delimiting the flow stream in the upstream and intermediate portions.

6. A turbomachine according to claim 5, wherein said end plate carries the flow-straightening vanes.

7. A turbomachine according to claim 5, wherein the upstream portion comprises a series of circularly spaced apart diffusion vanes forming between them said diffusion passages, and wherein the end plate is brazed to said diffusion vanes.

8. A turbomachine according to claim 1, wherein the shoulder is offset radially outward from an inner circumferential surface of the outer casing and the outer downstream edge of the intermediate portion is parallel to an axis of the turbomachine.

9. A turbomachine according to claim 1, wherein an outer radial edge of the vanes in the downstream portion directly faces an inner circumferential surface of the outer casing in a radial direction.

10. A turbomachine according to claim 1, wherein the vanes abut the outer casing when hot.

* * * * *